Oct. 8, 1940.                G. WÜNSCH                2,217,633
                      COURSE INDICATING DEVICE
               Filed Sept. 13, 1938        2 Sheets-Sheet 1
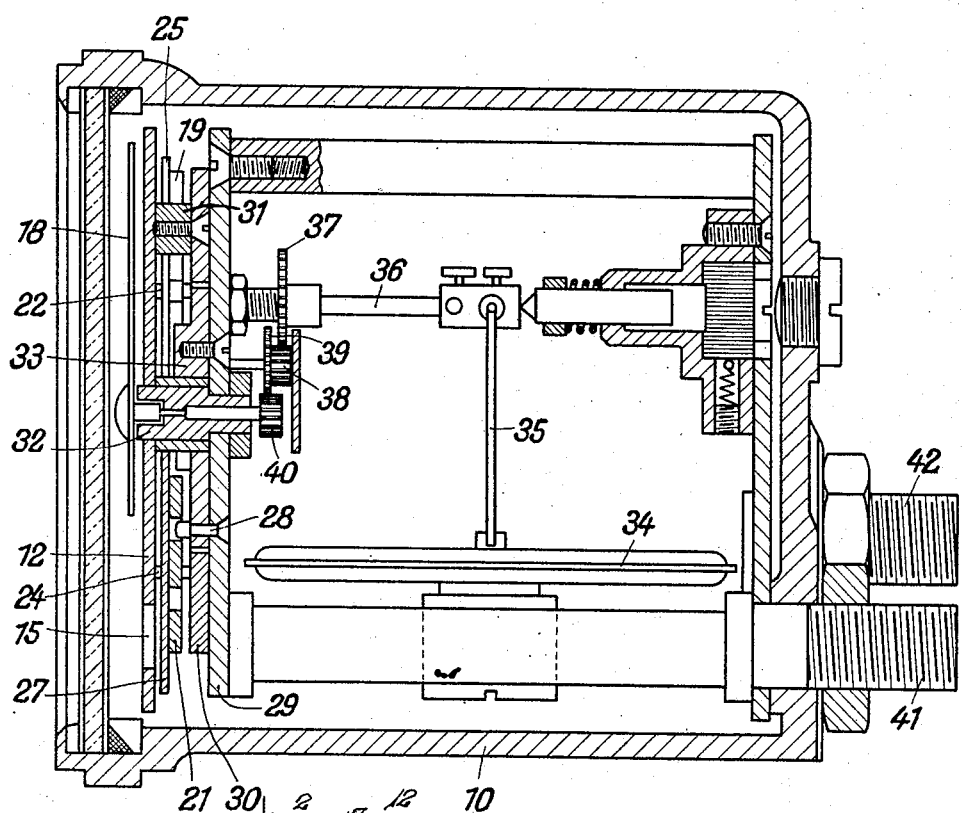
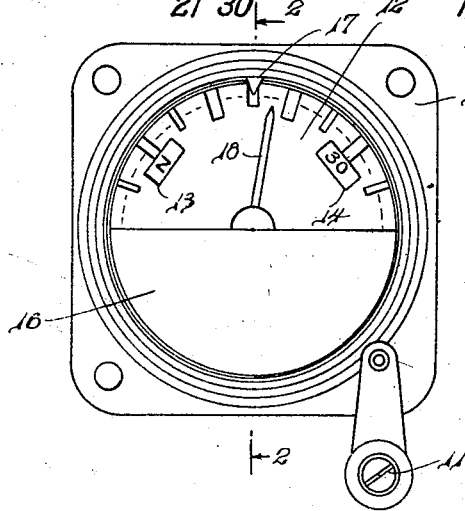
Inventor:
Guido Wunsch
By A. D. Adams
   Attorney Oct. 8, 1940.                G. WÜNSCH                    2,217,633
                      COURSE INDICATING DEVICE
                 Filed Sept. 13, 1938        2 Sheets-Sheet 2
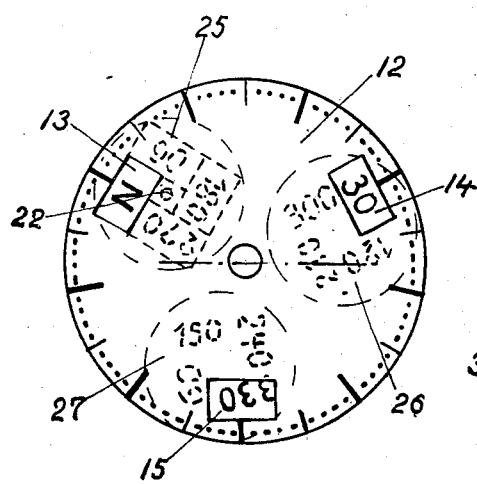
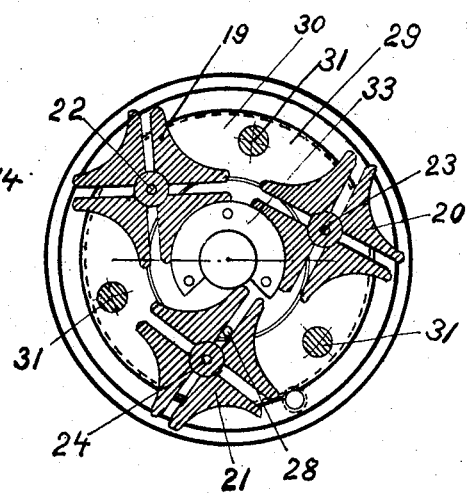
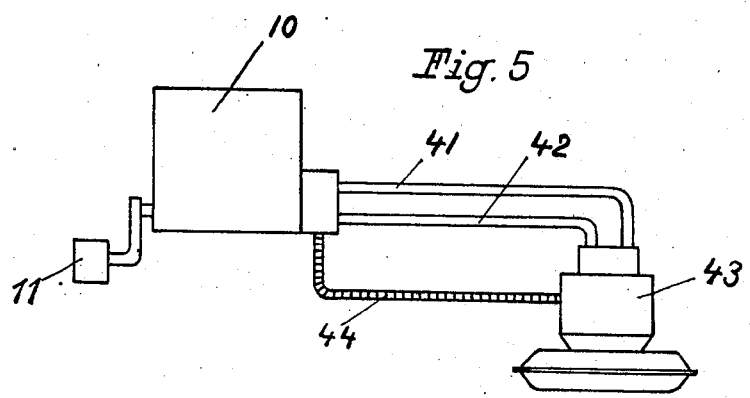
Inventor:
Guido Wünsch
By  A. D. Adams
           Attorney Patented Oct. 8, 1940

2,217,633

UNITED STATES PATENT OFFICE 2,217,633

COURSE INDICATING DEVICE

Guido Wünsch, Berlin-Steglitz, Germany, assignor to Askania-Werke A. G., a corporation of Germany Application September 13, 1938, Serial No. 229,745
In Germany September 14, 1937

5 Claims. (Cl. 33—204)

This invention relates to indicating devices, in particular to course indicating and setting apparatus for aircraft.

The installations heretofore in use generally consist of a course setting dial to which auxiliary course indicating dials may be connected in parallel and an installation for indicating deviations from the set course, which may be a tele-compass system adjustably connected to the course setting dial.

The main object of this invention is to provide a single instrument for setting the desired course and indicating at the same time deviations off same.

A further object is to indicate the true course followed by the craft on the course setting device, whereby additional indicators for the absolute course become unnecessary.

Further objects and aims of the invention will appear from a consideration of the following description and the accompanying drawings.

Referring to the drawings:

Fig. 1 is a front view of the course setting device as it appears in the instrument panel of an aircraft.

Fig. 2 is a vertical section through the course setting device along line 2 . . . 2 in Fig. 1.

Fig. 3 shows the scale with the dials rotatably arranged thereon.

Fig. 4 shows details of the gear mechanism for operating the dials.

Fig. 5 is a schematic view of the connection of the course setting device with a tele-compass.

The crank 11 pivoted at the bottom of the housing 10 of the course setting device serves in a well known manner for adjusting the dial 12. The course dial is provided with openings 13, 14, 15 in which numbers for marking the scale graduations are visible. The lower part of the dial is covered by a plate 16. The setting of the course is effected with respect to a fixed mark 17 which also serves as a zero mark for the pointer 18, indicating the deviations from the normal course.

Behind the windows 13, 14, 15 several discs are rotatably mounted on the course dial 12 which follow the movements of the dial.

The range of measurement of 360° requires four revolutions of the dial 12. Therefore, each revolution of the dial corresponds to a course change of 90°. As it is common practice to mark the graduation of course dials from 30° to 30°, it is advisable to provide three discs, each having four numbers, differing from one another and displaced relative to each other by 90°. The movement of the discs is caused by the switch gear shown in Fig. 4. This gear consists of three Maltese-crosses 19, 20, 21 which are rotatable about axles 22, 23, 24 moving with the course dial 12 and in rigid connection with the dials 25, 26, 27. The rotation of the Maltese crosses is effected by means of a pin 28 fixed to the housing when the respective disc is covered by the plate 16. The shaft 28 is in the base plate 29 fixed to the housing, onto which a bush 32 is centrally screwed. The course dial 12 is journalled on the bush 32. Three intermediate pieces 31 are riveted with the dial carrying a ring 30 screwed thereon. In the space between the dial 12 and the ring 30 the dials 25 to 27 with their switch gear 19 to 21 are arranged, the one end of the axles 22, 23, 24 being carried by the disc 12, and the other end by the ring 30. For locking the visible discs 25, 26 and their Maltesecrosses 20, 21, respectively, a ring 33 screwed onto the base plate 29 is provided in a well known manner.

As the representation of the dial 25 in Fig. 3 shows, the numbers arranged on the dials 25, 26, 27 are concentrated on a very small space in that the window 13 is asymmetrically arranged with respect to the axis of rotation 22 of the disc and two sides of each of the adjacent rectangles are in touch. The numbers can therefore, be much larger for the same diameter of the disc, than if the window would be symmetrically arranged with respect to the turning point of the disc, and the rectangles bordering the numbers would accordingly touch with their corners.

The ring 30 is provided at its circumference with teeth and is adjustably connected to the crank 11 by means of a reduction gear or pinion not shown.

The pressure gauge 34 shown in Fig. 2 serves for moving the course indicating pointer 18, which is connected to it by means of a leverage 35, 36 and a reduction gearing 37 to 40. The pointer 18 is mounted on the axle of the pinion 40, which axle is journalled in the bush 32.

As shown in Fig. 5, two conduits 41, 42 lead to the housing 10 of the course dial which are attached to a tele-compass 43. The tele-compass is fitted in a well known manner with a pneumatic control system which creates a differential pressure in the conduits 41, 42 upon deviations of the craft from the set course. The conduit 42 is in connection with the interior of the housing, while the conduit 41 leads to the interior of the pressure diaphragm casing 34. Each differential pressure causes a deflection of the pointer 18 which is limited in such a manner that the pointer 18 indicates the true course of the craft, the fixed mark 17 showing the desired course.

When changing the course set on the course dial 12 by rotating the crank 11, also the housing of the tele-compass 43 is turned by means of the flexible shaft 44 as is well-known in the art. The movement of the course dial 12 is effected by a reduction gear not illustrated. In the position shown in Fig. 1 the prescribed course set at the mark 17 is 15°, while the course of the craft transmitted from the compass and indicated by the course indicator 18 is 18°. Preferably, in place of the compass a compass controlled directional gyroscope should be provided, whereby an indication free from oscillation and less influenced by disturbing moments will be obtained.

In accordance with the provisions of the patent statute, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results out/lined, and the invention extends to such use.

What is claimed is:

1. In an indicating device of the character described having a course setting scale adapted to be adjusted synchronously with a master directional instrument, indicating means, co-operating with said scale and adapted to be controlled by said instrument according to deviations from the adjusted position proportionately to the ratio of the graduation of said scale, whereby an indication of the heading of said instrument is obtained.

2. In an indicating device for aircraft having a course setting scale adapted to be adjusted synchronously with a directional instrument indicating means co-operating with said scale and adapted to be controlled by said instrument according to deviations from the adjusted course proportionately to the ratio of the graduation of said scale, whereby an indication of the heading followed by the craft is obtained.

3. In an indicating device for aircraft having a course setting dial adapted to be connected for adjustment with a directional instrument and means for setting the course on said dial adapted to drive the dial at a multiple of the speed of said instrument, reference marks for the graduations of said dial interchangeable with each revolution of same, a fixed mark showing the adjusted position of said instrument on said dial, and indicating means, co-operating with said dial, controlled by said instrument according to deviations from the adjusted course proportionately to the ratio of the graduation of said dial, whereby an indication of the heading followed by the craft is obtained.

4. In an indicating device for aircraft having a course setting dial adapted to be connected for adjustment with a directional instrument and means for setting the course on said dial adapted to drive the dial at a fourfold greater speed than said instrument, a series of discs rotatably mounted on said dial behind openings of a cover plate, each of said discs carrying four angle designating characters differing and displaced by 90° arranged asymmetrically with respect to the turning axes of said discs, two sides of each of the rectangles occupied by said characters being in touch, means for alternately turning said discs about 90° after each revolution of said dial, and indicating means co-operating with said dial adapted to be controlled by said instrument according to deviations from the adjusted course proportionately to the ratio of the graduation of said dial, whereby an indication of the heading followed by the craft is obtained.

5. In a course setting and indicating device for aircraft enclosed within a housing having a course setting dial and means for setting the course on said dial including a speed-down gearing adapted to be connected to a directional instrument, reference marks for the graduations of said dial interchangeable with each revolution of same, a fixed mark showing the adjusted position of said instrument on said dial, a diaphragm responsive to differential pressure created by said instrument during deviations from the adjusted course, and a normally vertical pointer actuated by said diaphragm movable over said scale proportionately to the ratio of the graduation of said dial, whereby an indication of the heading followed by the craft is obtained.

GUIDO WÜNSCH.